US010230309B2

(12) United States Patent
Hwang

(10) Patent No.: US 10,230,309 B2
(45) Date of Patent: Mar. 12, 2019

(54) SYNCHRONOUS BRIDGE RECTIFIER, METHODS OF OPERATION THEREOF AND COMPONENTS THEREOF

(71) Applicant: Champion Microelectronic Corporation, Hsinchu (TW)

(72) Inventor: Jeffrey Hwang, Saratoga, CA (US)

(73) Assignee: Champion Microelectronics Corporation, Hsinchu (TW)

( * ) Notice: Subject to any disclaimer, the term of this patent is extended or adjusted under 35 U.S.C. 154(b) by 0 days.

(21) Appl. No.: 15/809,727

(22) Filed: Nov. 10, 2017

(65) Prior Publication Data

US 2019/0006954 A1 Jan. 3, 2019

Related U.S. Application Data

(60) Provisional application No. 62/528,118, filed on Jul. 2, 2017.

(51) Int. Cl.
*H02M 7/217* (2006.01)
*H02M 7/219* (2006.01)

(52) U.S. Cl.
CPC .... *H02M 7/219* (2013.01); *H02M 2007/2195* (2013.01)

(58) Field of Classification Search
CPC .... H02M 7/219; H02M 7/217; H02M 7/2173; Y02B 70/1408
USPC ... 363/44, 53, 80, 84, 89, 79, 125, 127, 132
See application file for complete search history.

(56) References Cited

U.S. PATENT DOCUMENTS

| | | | |
|---|---|---|---|
| 4,501,933 A | 2/1985 | Siligoni et al. | |
| 4,507,525 A | 3/1985 | Siligoni et al. | |
| 4,535,203 A | 8/1985 | Jenkins et al. | |
| 4,841,426 A | 6/1989 | Hakala | |
| 5,483,435 A | 1/1996 | Uchino | |
| 5,510,972 A | 4/1996 | Wong | |
| 5,625,549 A | 4/1997 | Horvat | |
| 6,052,299 A | 4/2000 | Schieke | |
| 6,324,084 B1 * | 11/2001 | Fujisawa | G04G 19/02 363/127 |
| 6,353,307 B1 | 3/2002 | Koelle et al. | |
| 6,421,261 B1 * | 7/2002 | Fujisawa | G04C 10/00 363/127 |
| 6,678,179 B2 | 1/2004 | Buehring | |
| 7,269,038 B2 * | 9/2007 | Shekhawat | H02M 1/42 363/71 |
| 7,817,450 B2 | 10/2010 | Fornage | |
| 8,045,350 B2 * | 10/2011 | Sells | H02M 7/219 363/127 |
| 8,294,402 B2 | 10/2012 | Watanabe et al. | |
| 8,320,143 B2 | 11/2012 | Leibovitz | |
| 8,614,874 B2 * | 12/2013 | Sells | H02M 7/219 361/246 |

(Continued)

Primary Examiner — Rajnikant Patel
(74) Attorney, Agent, or Firm — Westberg Law Offices

(57) ABSTRACT

A synchronous bridge rectifier comprises a plurality of synchronously switched elements and a plurality of controller circuits, one for each of the synchronously switched elements. The synchronously switched elements may be field-effect transistors. Each controller circuit is configured to sense voltage across the corresponding synchronously switched element to control opening and closing of the synchronously switched element so as to rectify the alternating current input signal to form a direct current output signal.

40 Claims, 7 Drawing Sheets

(56) References Cited

U.S. PATENT DOCUMENTS

| | | | |
|---|---|---|---|
| 8,704,462 B2 * | 4/2014 | Shteynberg | H05B 33/0815 |
| | | | 315/209 R |
| 9,041,075 B2 | 5/2015 | Seok | |
| 9,130,478 B2 | 9/2015 | Feldtkeller | |
| 9,257,915 B2 | 2/2016 | Oki et al. | |
| 9,337,171 B2 | 5/2016 | Seok | |
| 2003/0095423 A1 * | 5/2003 | Hirst | H02M 7/219 |
| | | | 363/127 |
| 2013/0249439 A1 * | 9/2013 | Shteynberg | H05B 33/0815 |
| | | | 315/307 |
| 2017/0179846 A1 * | 6/2017 | Hui | H02M 7/217 |

* cited by examiner

SYNCHRONOUS BRIDGE RECTIFIER, METHODS OF OPERATION THEREOF AND COMPONENTS THEREOF

This application claims priority of U.S. Provisional Application No. 62/528,118, filed Jul. 2, 2017, the entire contents of each of which are hereby incorporated by reference.

BACKGROUND OF THE INVENTION

The present invention relates to the field of bridge rectifiers and, more particularly, the present invention relates to synchronous bridge rectifiers, methods of operating synchronous bridge rectifiers, and components thereof.

A bridge rectifier converts an alternating current (AC) signal to a direct current (DC) signal. This process is also referred to as "rectification." Bridge rectifiers are commonly used in off-line power supplies that receive power from a sinusoidal AC power source and provide a voltage-regulated DC output that can be used to power a load, such as an electronic device. While such power supplies often perform subsequent processing and transformation on the rectified DC signal, a bridge rectifier performs an essential function of converting the AC signal to a DC signal.

FIG. 1 illustrates a bridge rectifier circuit of the prior art. As shown in FIG. 1, a first diode $D_1$ has its cathode coupled to the cathode of a second diode $D_2$. The anode of the second diode $D_2$ is coupled to the cathode of a third diode $D_3$. The anode of the third diode $D_3$ is coupled to the anode of a fourth diode $D_4$. The cathode of the fourth diode $D_4$ is coupled to the anode of the first diode $D_1$. The node between the anode of the first diode $D_1$ and the cathode of the fourth diode $D_4$ provides a first input terminal for the AC source, while the node between the anode of the second diode $D_2$ and the cathode of the third diode $D_3$ provides a second input terminal for the AC source. The node between the cathode of the first diode $D_1$ and the cathode of the second diode $D_2$ provides a first output terminal for the DC signal, while the node between the anode of the third diode $D_3$ and the anode of the fourth diode $D_4$ provides a second output terminal for the DC signal. An AC input signal $V_{AC}$ is applied across the input terminals to produce a rectified DC output signal $V_{DC}$ across the output terminals.

FIG. 2 illustrates the AC sine wave input signal $V_{AC}$ and the rectified DC output signal $V_{DC}$. As shown in FIG. 2, the AC input signal $V_{AC}$ crosses above and below the zero volt level. The resulting pulsating DC output signal $V_{DC}$ remains above the zero volt level. The rectifier illustrated in FIGS. 1 and 2 is a full-wave rectifier, meaning that positive and negative portions of the AC input signal, above and below the zero volt level, are transformed to the output. Other types of rectifiers include half-wave rectifiers in which either the positive or negative half of the AC input is passed to the output, while the other half is blocked.

Use of diodes in the rectifier makes for a relatively simple design, however, the voltage drop across the diodes (approximately 0.7 volts), generates heat and diminishes efficiency. Therefore, what is needed is an improved bridge rectifier.

SUMMARY OF THE INVENTION

The present invention provides a synchronous bridge rectifier, methods of operation thereof and components thereof. In an embodiment, a synchronous bridge rectifier comprises a plurality of synchronously switched elements (e.g., field-effect transistors) and a plurality of controller circuits, one for each of the synchronously switched elements. Each controller circuit is configured to sense voltage across the corresponding synchronously switched element to control opening and closing of the synchronously switched element so as to rectify the alternating current input signal to form a direct current output signal. The controller circuits preferably operate independently of the others without centralized control.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

Figure 1:
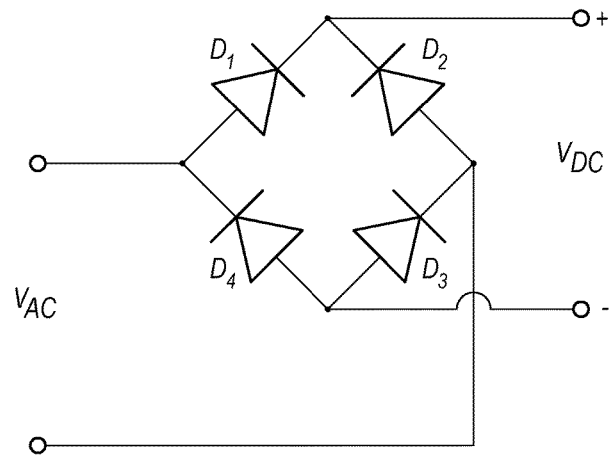
FIG. 1 illustrates a diode bridge rectifier circuit of the prior art.
Figure 2:
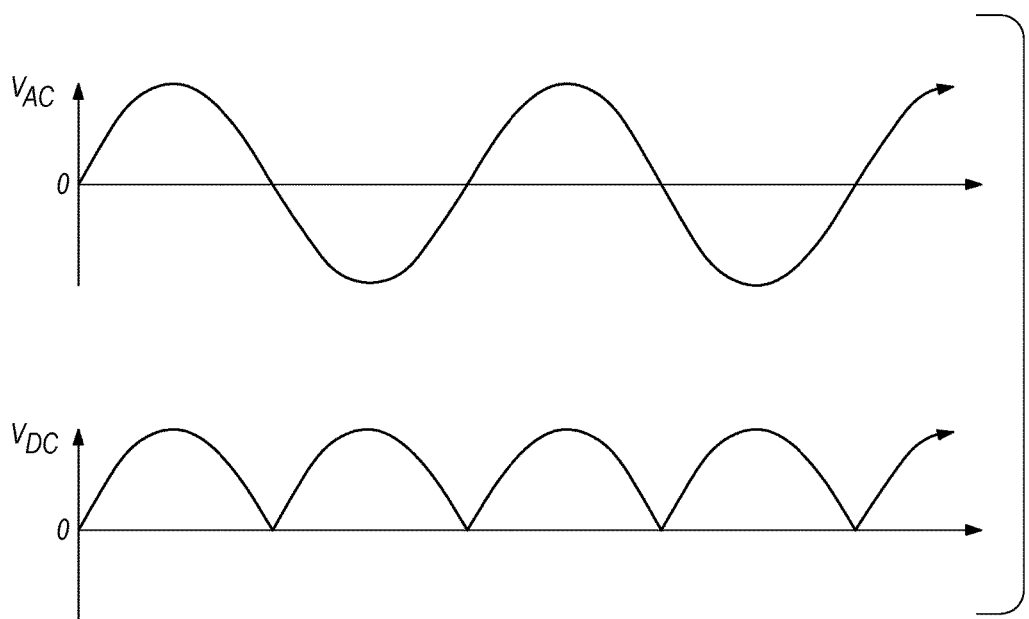
FIG. 2 illustrates an alternating-current sine wave voltage signal and a full-wave rectified sine wave voltage signal.

In accordance with an embodiment of the present invention, a synchronous bridge rectifier is provided in which synchronously switched elements are field-effect transistors (FETs or MOSFETs or NMOSFETs). Each FET is controlled by its own controller circuit that senses voltage across the drain and source of the FET and, in response to the sensed voltage, controls the gate of the FET to turn the FET on and off at appropriate times in order to rectify an alternating current (AC) input signal of an AC source to form a direct current DC output signal.

Each controller circuit is preferably implemented as an integrated circuit (IC) equipped with a power supply for powering itself from the AC input signal. A capacitor coupled to each controller circuit serves as an energy reservoir to provide power to the controller circuit at times when the power supply of the controller circuit is unable to derive power from the AC input signal.

Each controller circuit preferably has exactly four terminals, including a gate terminal configured to control the gate of the corresponding FET, a drain terminal corresponding to the drain of the corresponding FET, a source terminal corresponding to the source of the corresponding FET and a supply terminal. The controller is configured to sense voltage across the drain and source of the corresponding FET for controlling switching of the FET. The controller is also configured to obtain power for powering the controller circuit from the AC input signal. The supply terminal is coupled to a capacitor that provides energy storage for powering the controller circuit when the AC source is not available for use by the power supply of the controller circuit.

Each controller may include a first comparator configured to compare a sensing signal that is representative of a drain-to-source voltage of the first field-effect transistor to a first reference voltage level for turning the first field-effect transistor off. Each controller may also include a second comparator configured to compare the sensing signal that is representative of the drain-to-source voltage of the first field-effect transistor to a second reference voltage level for turning the first field-effect transistor on. Additional controller components may be provided, as described herein.

The combinations of a controller circuit, FET and capacitor are referred to herein as "switching units." Such a switching unit can also be referred to an "ideal diode." When combined, the controller circuit, its corresponding FET and capacitor preferably have exactly two terminals, namely, the drain and source terminals, so that each switching unit also has exactly these same two terminals. As such, an embodiment of the present invention also provides a diode replacement which can be used in a bridge rectifier as well as other diode applications. Such switching units can be used in parallel in order to increase their current-handling capacity. For example, two bridge rectifier circuits can be employed in parallel to provide rectified current to a large capacity power supply.

In an embodiment of a full-wave bridge rectifier, four controller circuits, each with corresponding FET and capacitor, are provided. Each of these four switching units can be identical to the others though connected in a full bridge configuration. The switching units each preferably operate independently of the others without centralized control; however, the operation of each switching unit is synchronized to the AC input signal and thus operation of all of the switching units is synchronized to perform rectification of the AC input signal.

Because the controllers are each provided with a power supply, no centralized or external power supply is needed. Also, because there is no centralized or external power supply, there is no need for a common ground node. Rather, each switching unit has its own common voltage reference which corresponds to the source terminal of the FET. As such, no high side driver is needed (a high side driver is a control circuit capable of driving the gate of a FET whose source terminal is not referenced to same ground as the control circuit).

In an embodiment, a bridge rectifier integrated circuit (IC) package is provided. Such an IC package can include four controller circuits, each with corresponding FET and capacitor. Thus, the package includes four controller circuits, four FETs and four capacitors. The package may be provided with exactly four terminals, including two AC input terminals and two DC output terminals. In an alternative embodiment, an IC package can include two controller circuits, each with corresponding FET and capacitor. In this case, each IC package can have exactly three terminals. Two such IC packages can be combined to form a bridge rectifier having two AC input terminals and two DC output terminals.

Figure 3:
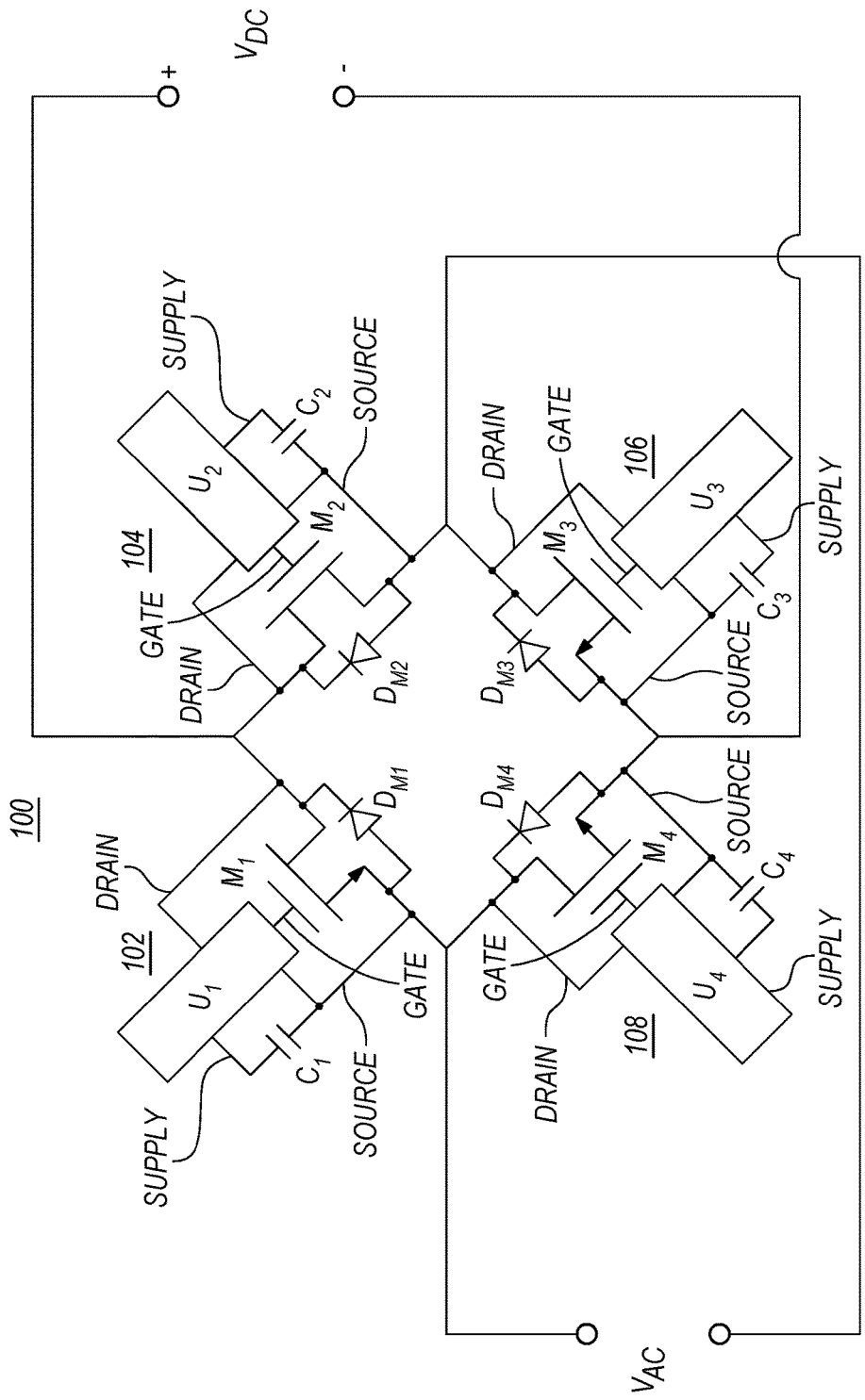
FIG. 3 illustrates a synchronous bridge rectifier in accordance with an embodiment of the present invention.

FIG. 3 illustrates a synchronous bridge rectifier 100 in accordance with an embodiment of the present invention. FIG. 3 shows a full-wave bridge rectifier arrangement with four synchronous switching units 102, 104, 106 and 108. A first switching unit 102 has a controller $U_1$, a FET $M_1$ and a capacitor $C_1$. A drain terminal of the FET $M_1$ is coupled to a drain terminal of the controller $U_1$. A source terminal of the FET $M_1$ is coupled to a source terminal of the controller $U_1$. The FET $M_1$ includes a body diode $D_{M1}$ having its cathode coupled to the drain of the FET $M_1$ and its anode coupled to the source of the FET $M_1$. A gate terminal of the FET $M_1$ is coupled to a gate terminal of the controller $U_1$. A supply terminal of the controller $U_1$ is coupled to a first terminal of a capacitor $C_1$. A second terminal of the capacitor $C_1$ is coupled to the source terminal of controller $U_1$ and to source terminal of the FET $M_1$. The switching unit 102 has drain and source terminals that correspond to those of the FET $M_1$ and the controller $U_1$.

A second switching unit 104 has a controller $U_2$, a FET $M_2$ and a capacitor $C_2$. A drain terminal of the FET $M_2$ is coupled to a drain terminal of the controller $U_2$. A source terminal of the FET $M_2$ is coupled to a source terminal of the controller $U_2$. The FET $M_2$ includes a body diode $D_{M2}$ having its cathode coupled to the drain of the FET $M_2$ and its anode coupled to the source of the FET $M_2$. A gate terminal of the FET $M_2$ is coupled to a gate terminal of the controller $U_2$. A supply terminal of the controller $U_2$ is coupled to a first terminal of a capacitor $C_2$. A second terminal of the capacitor $C_2$ is coupled to the source terminal of controller $U_2$ and to source terminal of the FET $M_2$. The switching unit 104 has drain and source terminals that correspond to those of the FET $M_2$ and the controller $U_2$.

A third switching unit 106 has a controller U3, a FET $M_3$ and a capacitor $C_3$. A drain terminal of the FET $M_3$ is coupled to a drain terminal of the controller $U_3$. A source terminal of the FET $M_3$ is coupled to a source terminal of the controller $U_3$. The FET $M_3$ includes a body diode $D_{M3}$ having its cathode coupled to the drain of the FET $M_3$ and its anode coupled to the source of the FET $M_3$. A gate terminal of the FET $M_3$ is coupled to a gate terminal of the controller $U_3$. A supply terminal of the controller $U_3$ is coupled to a first terminal of a capacitor $C_3$. A second terminal of the capacitor $C_3$ is coupled to the source terminal of controller $U_3$ and to source terminal of the FET $M_3$. The switching unit 106 has drain and source terminals that correspond to those of the FET $M_3$ and the controller $U_3$.

A fourth switching unit 108 has a controller $U_4$, a FET $M_4$ and a capacitor $C_4$. A drain terminal of the FET $M_4$ is coupled to a drain terminal of the controller $U_4$. A source terminal of the FET $M_4$ is coupled to a source terminal of the controller $U_4$. The FET $M_4$ includes a body diode $D_{M4}$ having its cathode coupled to the drain of the FET $M_4$ and its anode coupled to the source of the FET $M_4$. A gate terminal of the FET $M_4$ is coupled to a gate terminal of the controller $U_4$. A supply terminal of the controller $U_4$ is coupled to a first terminal of a capacitor $C_4$. A second terminal of the capacitor $C_4$ is coupled to the source terminal of controller $U_4$ and to source terminal of the FET $M_4$. The switching unit 108 has drain and source terminals that correspond to those of the FET $M_4$ and the controller $U_4$.

The source terminal of the switching unit 102 is coupled to the drain terminal of the switching unit 108. This node provides a first input terminal for the AC source. The drain terminal of the switching unit 102 is coupled to the drain terminal of the switching unit 104. This node provides a first output terminal for the DC output. The source terminal of the switching unit 104 is coupled to the drain terminal of the switching unit 106. This node provides a second input terminal for the AC source. The source terminal of the switching unit 106 is coupled to the source terminal of the switching unit 108. This node provides a second output terminal for the DC output. When an AC input signal $V_{AC}$ is applied across the input terminals of the rectifier 100, a rectified DC output signal $V_{DC}$ is formed across the output terminals of the rectifier 100.

Figure 4:
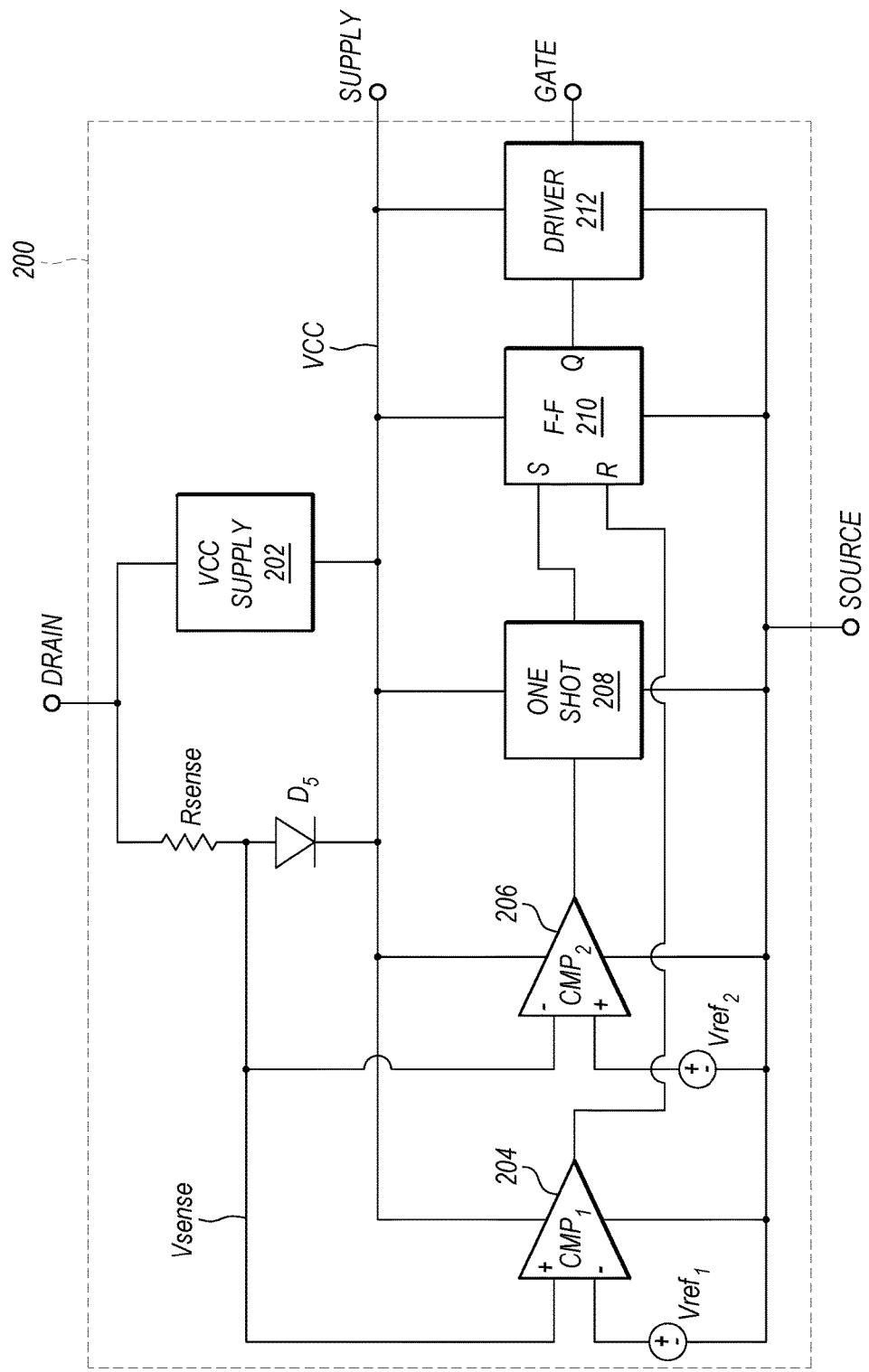
FIG. 4 illustrates a control circuit for a switching unit of a synchronous bridge rectifier in accordance with an embodiment of the present invention.

FIG. 4 illustrates a control circuit 200 for a synchronous bridge rectifier in accordance with an embodiment of the present invention. The control circuit 200 can be used in place of each of the control circuits $U_1$-$U_4$ shown in FIG. 3. As shown in FIG. 4, the control circuit 200 has a Vcc supply 202, a sensing resistor $R_{SENSE}$, a diode $D_5$, a first comparator 204, a second comparator 206, a one shot 208, a flip-flip 210, driver 212 and reference voltages Vref1 and Vref2.

The drain terminal of the control circuit 200 is coupled to a first terminal of the resistor $R_{SENSE}$ and to a first terminal of the Vcc supply 202. A second terminal of the resistor $R_{SENSE}$ is coupled to an anode of the diode $D_5$ and to a first input terminal of each of the comparators 204 and 206. A voltage sensing signal $V_{SENSE}$ is generated at the node between the resistor $R_{SENSE}$ and the diode $D_5$. A second terminal of the Vcc supply 202 and a cathode of the diode $D_5$ are coupled to the supply terminal of the control circuit 200. A capacitor external to the control circuit 200 (this external capacitor is not shown in FIG. 4, but instead shown in FIG. 3 as $C_1$, $C_2$, $C_3$ or $C_4$) is coupled across the supply and source terminals of the control circuit 200.

The controller circuit 200 is configured to receive current from the AC source $V_{AC}$ at the drain terminal of the controller circuit 200. This current passes through the resistor $R_{SENSE}$ and diode $D_5$ to charge the external capacitor ($C_1$, $C_2$, $C_3$ or $C_4$). In addition, current from the drain terminal is received at the first terminal of the Vcc supply 202 and used by the Vcc supply 202 to generate a regulated output voltage Vcc at the second terminal of the Vcc supply which regulates the voltage level on the external capacitor and which generates power for components of the controller circuit 200.

More particularly, the Vcc supply voltage is coupled to provide power to Vcc supply terminals of the first comparator 204, the second comparator 206, the one shot 208, the flip-flip 210, the driver 212. The reference voltages Vref1 and Vref2 can be derived from a voltage level of the supply terminal. Ground terminals of the each of the first comparator 204, the second comparator 206, the one shot 208, the flip-flip 210, the driver 212 and reference voltages Vref1 and Vref2 are coupled to the source terminal of the control circuit 200. The source terminal serves as a common (ground) node for the control circuit 200.

The level of the voltage sensing signal $V_{SENSE}$ is representative of the drain-to-source voltage ($V_{DS}$) of the corresponding FET ($M_1$, $M_2$, $M_3$ or $M_4$). The drain-to-source voltage of the FET is representative of the AC source signal $V_{AC}$ as well as the level of drain-to-source current through the FET. More particularly, the signal $V_{SENSE}$ represents the instantaneous level of $V_{AC}$ and, thus, represents the point in the repetitive cycle of the AC source at each instant. The signal $V_{SENSE}$ also represents the level of current through the FET since the FET has a drain-to-source resistance ($R_{DS}$). The signal $V_{SENSE}$ is applied to a first input terminal (e.g., noninverting input) of the comparator 204 and to a first input terminal (e.g., inverting input) of the comparator 206. A second input terminal of the comparator 204 receives the first reference voltage Vref1 while a second input terminal of the comparator 206 receives the second reference voltage Vref2. The first reference voltage Vref1 can be, for example, −5 mV, while the second reference voltage Vref2 can be, for example, −100 mv. Therefore, the first reference voltage Vref1 is higher than the second reference voltage Vref2.

Synchronous rectification is performed as follows. When the level of $V_{AC}$ is above zero, the controller 200 in the position of $U_1$ (FIG. 3) turns on the FET $M_1$ so that it is conducting (ON). The controller 200 in the position of $U_3$ also turns on the FET $M_3$ so that it is conducting (ON), while the controllers 200 in the position of $U_2$ and $U_4$ turn off the FET $M_2$ and $M_4$ so that they are non-conducting (OFF). This causes the voltage $V_{AC}$ to be passed to the output $V_{DC}$ without reversing its polarity.

Conversely, when the level of $V_{AC}$ is below zero, the controller 200 in the position of $U_1$ (FIG. 3) turns off the FET $M_1$ so that it is non-conducting (OFF). The controller 200 in the position of $U_3$ also turns off the FET $M_3$ so that it is non-conducting (OFF), while the controllers 200 in the position of $U_2$ and $U_4$ turn on the FET $M_2$ and $M_4$ so that they are conducting (ON). This causes the voltage $V_{AC}$ to be passed to the output $V_{DC}$ with its polarity reversed. This cycle is repeated for each cycle of the input signal $V_{AC}$ thereby forming the rectified DC the signal $V_{DC}$.

The above is accomplished in accordance with the following synchronous switching cycle. While the level of $V_{AC}$ is above zero, the FETs $M_1$ and $M_3$ are on (with current flowing from source to drain) and the FETs $M_2$ and $M_4$ are off. Under these conditions, the drain-to-source voltage across the FETs $M_1$ and $M_3$ is negative and the level of $V_{SENSE}$ for the controllers $U_1$ and $U_3$ is also negative. Also, the drain-to-source voltage across the FETs $M_2$ and $M_4$ is positive and the level of $V_{SENSE}$ for the controllers $U_2$ and $U_4$ is also positive.

Then, as the level of $V_{AC}$ falls such that it approaches the zero volt level, the drain-to-source voltages across the FETs $M_1$ and $M_3$ begin transitioning from negative to positive ($V_{DS}$ is rising). This causes the level of $V_{SENSE}$ for the controllers $U_1$ and $U_3$ to rise. Once the levels of $V_{SENSE}$ for each of the controllers $U_1$ and $U_3$ rises above Vref1, this triggers the comparators 204 of $U_1$ and $U_3$, which then resets the flip-flops 210 and turns off the FETs $M_1$ and $M_3$ via drivers 212.

Meanwhile, as the level of $V_{AC}$ falls such that it approaches the zero volt level, the drain-to-source voltages across the FETs $M_2$ and $M_4$ begin transitioning from positive to negative ($V_{DS}$ is falling). This causes the levels of $V_{SENSE}$ for each of the controllers $U_2$ and $U_4$ to fall. Once the level of $V_{SENSE}$ falls below Vref2, the comparators 206 of $U_2$ and $U_4$ then trigger the one-shots 208 to set the flip-flops 210 which turns on the FETs $M_2$ and $M_4$ via drivers 212.

Each of the one-shots 208 functions to generate a pulse sufficient to set the flip-flops 210, though the output of the one-shot 208 will then transition to a logic low voltage even if the output of the comparator 206 remains a logic high voltage. This prevents the FETs from turning on more than once per cycle of the AC source $V_{AC}$.

While the level of $V_{AC}$ remains below zero, the FETs $M_2$ and $M_4$ are on (with current flowing from source to drain) and the FETs $M_1$ and $M_3$ are off. Under these conditions, the drain-to-source voltage across the FETs $M_2$ and $M_4$ is negative and the level of $V_{SENSE}$ for the controllers $U_2$ and $U_4$ is also negative. Also, the drain-to-source voltage across the FETs $M_1$ and $M_3$ is positive and the level of $V_{SENSE}$ for the controllers $U_1$ and $U_3$ is also positive.

Then, as the level of $V_{AC}$ rises such that it approaches the zero volt level, the drain-to-source voltages across the FETs $M_2$ and $M_4$ begin transitioning from negative to positive ($V_{DS}$ is rising). This causes the level of $V_{SENSE}$ for the controllers $U_2$ and $U_4$ to rise. Once the levels of $V_{SENSE}$ for each of the controllers $U_2$ and $U_4$ rises above Vref1, this triggers the comparators 204 of $U_2$ and $U_4$, which then resets the flip-flops 210 and turns off the FETs $M_2$ and $M_4$ via drivers 212.

Meanwhile, as the level of $V_{AC}$ rises such that it approaches the zero volt level, the drain-to-source voltages across the FETs $M_1$ and $M_3$ begin transitioning from positive to negative ($V_{DS}$ is falling). This causes the levels of $V_{SENSE}$ for each of the controllers $U_1$ and $U_3$ to fall. Once the level of $V_{SENSE}$ falls below Vref2, the comparators 206 of $U_1$ and $U_3$ then trigger the one-shots 208 to set the flip-flops 210 which turns on the FETs $M_1$ and $M_3$ via drivers 212.

The above-described synchronous switching cycle repeats for each cycle of the input voltage $V_{AC}$.

Because the comparators 204 and 206 are activated at different levels of $V_{SENSE}$ to turn the FETs $M_1$, $M_2$, $M_3$ and $M_4$ on and off, this prevents any adjacent FETs from being on at the same time which could cause shoot through or short circuiting. This is despite the controllers $U_1$, $U_2$, $U_3$ and $U_4$ all operating independently.

As explained herein, each controller circuit 200 is preferably equipped with a power supply 202 for powering itself from the AC source. A capacitor coupled to each controller circuit (capacitors $C_1$, $C_2$, $C_3$, and $C_4$) serves as an energy reservoir for the controller circuit 200. When the drain-to-source voltage of the corresponding one of the FETs $M_1$, $M_2$, $M_3$ and $M_4$, is positive, the FET is turned off and the power supply 202 charges the corresponding one of the capacitors ($C_1$, $C_2$, $C_3$, and $C_4$). Current through the sensing resistor $R_{SENSE}$ can also charge the corresponding one of the capacitors ($C_1$, $C_2$, $C_3$, and $C_4$). The current for charging the capacitors $C_1$, $C_2$, $C_3$, and $C_4$ is obtained from the input AC source $V_{AC}$. When the drain-to-source voltage of the corresponding one of the FETs $M_1$, $M_2$, $M_3$ and $M_4$, is negative, the FET is turned on. Under this condition, the AC source is unavailable to charge the corresponding one of the capacitors ($C_1$, $C_2$, $C_3$, and $C_4$). This is because $V_{AC}$ is of the opposite polarity than the voltage on the capacitor. Also under this condition, the charge on the capacitor is used to power the controller 200 until $V_{AC}$ changes polarity and again becomes available to charge the capacitor. Thus, the capacitor coupled to each controller circuit 200 serves as an energy reservoir to provide power to the controller circuit 200 at times when the power supply of the controller circuit is unable to derive power from the AC input signal. Because the controller 200 uses only a small amount of energy and the duration of time that the capacitor needs to serve as a reservoir is short (e.g., 8-10 milliseconds for a 50 Hz AC source), the capacitor can be small (e.g. on the order of 10-20 nF). The level of Vcc is preferably maintained between approximately 15 and 20 volts DC which can vary dependent upon the reservoir capacitor size and discharge rate during each cycle of $V_{AC}$.

Figure 5:
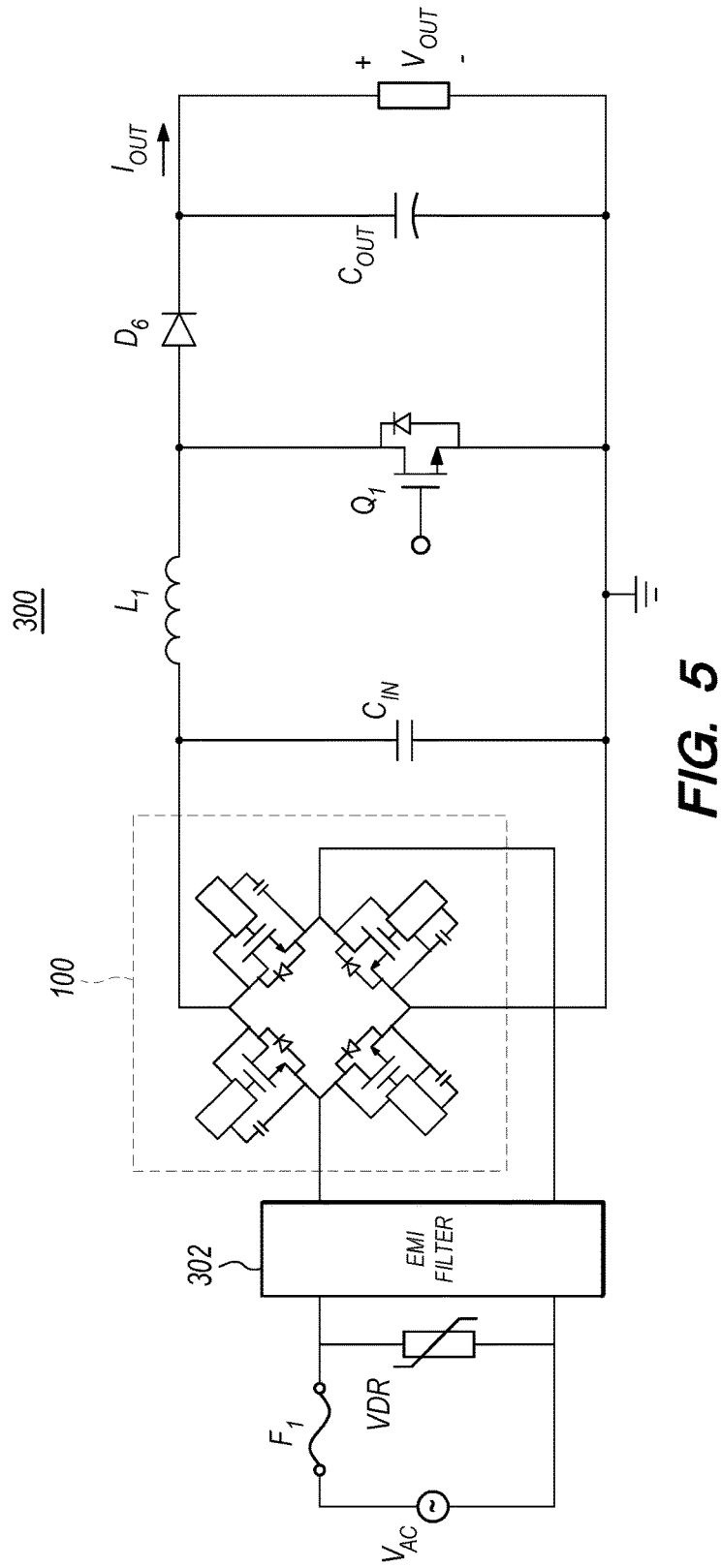
FIG. 5 illustrates a switching power converter in accordance with an embodiment of the present invention.

FIG. 5 illustrates a switching power converter 300 in accordance with an embodiment of the present invention. As shown in FIG. 5, the switching power converter 300 is configured to receive power from an AC source $V_{AC}$. A first input terminal of converter 300 is coupled to a first terminal of a fuse $F_1$. A second terminal of the fuse $F_1$ is coupled to a first input terminal of an electromagnetic interference (EMI) filter 302. A second input terminal of converter 300 is coupled to a second input terminal of the EMI filter 302. A first output terminal of the EMI filter 302 is coupled to a first AC input terminal of the synchronous rectifier 100. A second output terminal of the EMI filter 302 is coupled to a second AC input terminal of the synchronous rectifier 100.

A first DC output terminal of the synchronous rectifier 100 is coupled to a first terminal of an inductor $L_1$. And to a first terminal of a capacitor $C_{IN}$. A second terminal of the inductor $L_1$ is coupled to an anode of a diode $D_6$ and to a drain terminal of a transistor $Q_1$. A cathode of the diode $D_6$ is coupled to a first terminal of a capacitor $C_{OUT}$ and to an output terminal of the converter 300. A second DC output terminal of the synchronous rectifier 100, a second terminal of the capacitor $C_{IN}$, a second terminal of the capacitor $C_{OUT}$, and a source terminal of the transistor $Q_1$ are coupled to a ground node. The converter 300 is configured to provide a regulated DC output voltage $V_{OUT}$ to a load by turning the transistor $Q_1$ on and off using frequency modulation (FM) or pulse-width modulation (PWM).

While a boost converter is shown in FIG. 5, the present invention can used for any type of power converter or power supply that requires a bridge rectifier, such as buck converter, a buck-boost converter, resonant converter, a power-factor correction stage of a switching power supply and so forth. Also, while a full-bridge rectifier is shown in FIGS. 3 and 5, it will be apparent that the switching units of the present invention can be used in other types of rectifiers, such as a half-bridge rectifier. The switching units of the present invention may also be used to replace diodes or other types of rectifiers in other contexts.

As explained herein, the level of $V_{SENSE}$ in each of the controllers $U_1$, $U_2$, $U_3$ and $U_4$ is representative of the instantaneous level of $V_{AC}$ and is also representative of the level of current through the corresponding FET $M_1$, $M_2$, $M_3$ and $M_4$. This is because the FETs each have a drain-to-source resistance ($R_{DS}$) which affects the drain-to-source voltage level ($V_{DS}$). When used in a power supply, such as the one shown in FIG. 5, the power requirements of the load can change over time. In response to such changing load requirements, the levels of the currents through the FET $M_1$, $M_2$, $M_3$ and $M_4$ can also change. In some conditions, where the load is light or temporarily ceases drawing power, the level of current in the FETs $M_1$, $M_2$, $M_3$ and $M_4$ may be sufficiently low that the level of $V_{SENSE}$ does not trigger the comparators 206 to turn on the FETs $M_1$, $M_2$, $M_3$ and $M_4$. In this case, the bridge rectifier 100 maintains the FETs $M_1$, $M_2$, $M_3$ and $M_4$ in an off condition, thereby conserving energy, until such time as the current demand rises sufficiently that the FETs again resume synchronous rectification.

Figure 6:
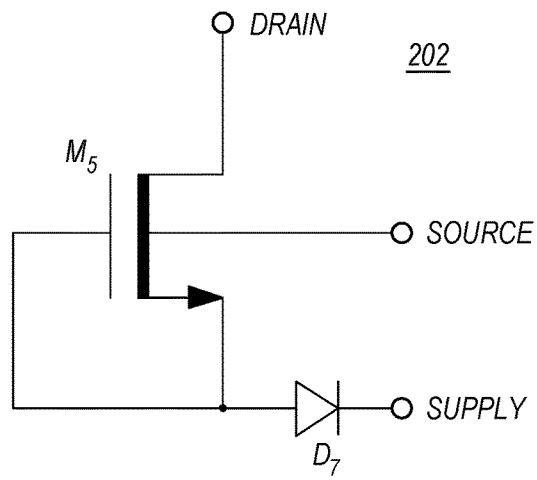
FIG. 6 illustrates a power supply for a switching unit in accordance with an embodiment of the present invention.

FIG. 6 illustrates a power supply 202 for the controller 200 of the switching units 102, 104, 106 and 108 in accordance with an embodiment of the present invention. As shown in FIG. 6, a depletion mode MOSFET $M_5$, e.g., an 800 volt, ultra-high voltage (UHV) NMOSFET, has its drain terminal coupled to the drain terminal of the controller 200. The source and gate terminals of $M_5$ are coupled to each other and to an anode of a diode $D_7$. A cathode of the diode $D_7$ is coupled to the supply terminal of the controller 200. A body terminal of $M_5$ is coupled to the source terminal of the controller. When the drain-to-source voltage of the corresponding one of the FETs $M_1$, $M_2$, $M_3$ and $M_4$ is positive, the power supply 202 of the corresponding controller 200 is active; under these conditions, the power supply 202 supplies power to components of the controller 200 and charges the corresponding one of the external capacitors $C_1$, $C_2$, $C_3$ and $C_4$. When the drain-to-source voltage of the corresponding one of the FETs $M_1$, $M_2$, $M_3$ and $M_4$ is negative, the power supply 202 is inactive and the controller 200 instead draws power from the corresponding one of the external capacitors $C_1$, $C_2$, $C_3$ and $C_4$. The resistor $R_{SENSE}$ can also be implemented as a depletion mode MOSFET. The resistor $R_{SENSE}$ and the power supply 202 can be combined and implemented as a single component.

Figure 7:
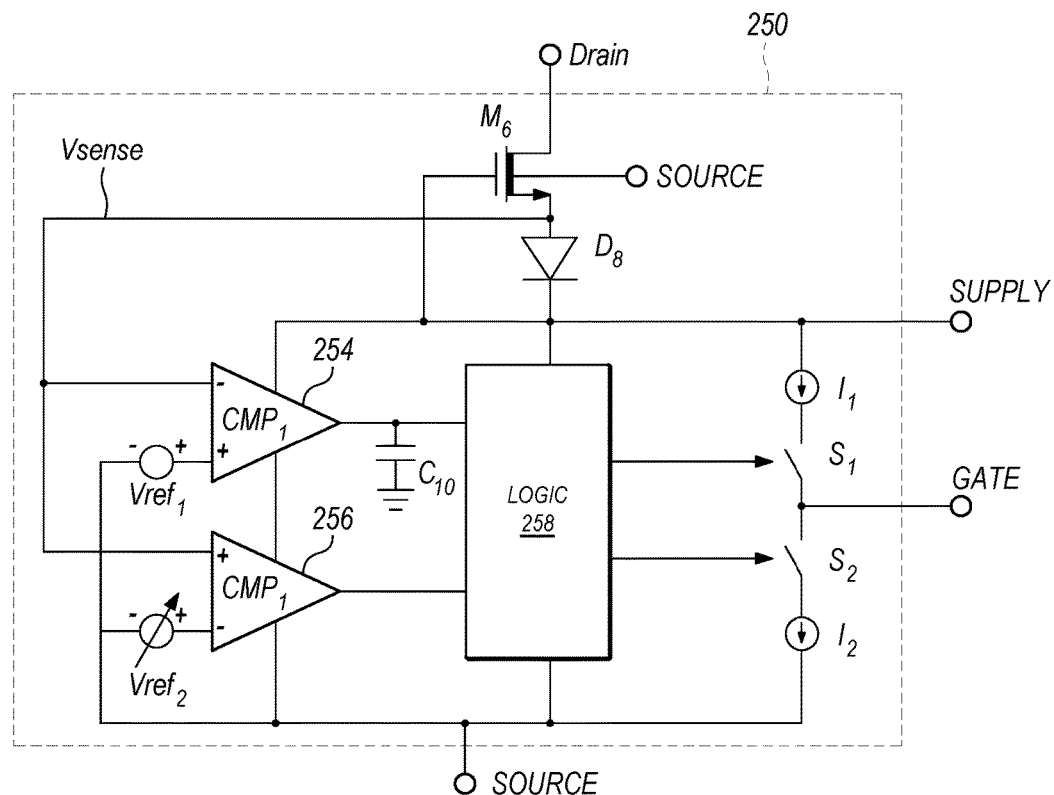
FIG. 7 illustrates an alternative embodiment of a control circuit for a switching unit of a synchronous bridge rectifier in accordance with an embodiment of the present invention.

FIG. 7 illustrates an alternative embodiment of a control circuit 250 for a switching unit of a synchronous bridge rectifier in accordance with an embodiment of the present invention. This embodiment employs a single depletion mode MOSFET to perform the functions of $R_{SENSE}$ and the power supply 202 of FIG. 4, namely the FET $M_6$ shown in FIG. 7. The control circuit 250 of FIG. 7 can be used in place of each of the control circuits $U_1$-$U_4$ shown in FIG. 3. As shown in FIG. 7, the control circuit 250 includes a FET $M_6$, a diode $D_8$, a first comparator 254, a second comparator 256, a capacitor $C_{10}$, logic 258, switches $S_1$ and $S_2$, current sources $I_1$ and $I_2$, and reference voltages Vref1 and Vref2. The FET $M_6$ is preferably a depletion mode, 800 volt, ultra-high voltage (UHV) NMOSFET.

As shown in FIG. 7, the FET $M_6$ has its drain terminal coupled to the drain terminal of the controller 250. A source terminal of the FET $M_6$ is coupled to an anode of the diode $D_8$ and to a first input terminal of each of the comparators 254 and 256. A voltage sensing signal $V_{SENSE}$ is generated at the node between the source terminal of the FET $M_6$ and the diode $D_8$. A gate terminal of the FET $M_6$ and a cathode of the diode $D_8$ are coupled to the supply terminal of the control circuit 250. A capacitor external to the control circuit 250 (this external capacitor is not shown in FIG. 7, but instead shown in FIG. 3 as $C_1$, $C_2$, $C_3$ or $C_4$) is coupled across the supply and source terminals of the control circuit 250.

The controller circuit 200 is configured to receive current from the AC source $V_{AC}$ at the drain terminal of the controller circuit 250. This current passes through the FET $M_6$ and diode $D_8$ to charge the external capacitor ($C_1$, $C_2$, $C_3$ or $C_4$) which provides power for components of the controller circuit 250. In addition, the FET $M_6$ regulates this voltage level on the external capacitor to approximately 15-20 volts DC.

The Vcc supply voltage is coupled to provide power to Vcc supply terminals of the first comparator 254, the second comparator 256, and logic 258. The reference voltages Vref1 and Vref2 and the current sources $I_1$ and $I_2$ can be derived from the Vcc supply voltage. Ground terminals of the each of the first comparator 254, the second comparator 256, logic 258 and reference voltages Vref1 and Vref2 are coupled to the source terminal of the control circuit 250. The source terminal serves as a common (ground) node for the control circuit 250.

The level of the voltage sensing signal $V_{SENSE}$ is representative of the drain-to-source voltage ($V_{DS}$) of the corresponding FET ($M_1$, $M_2$, $M_3$ or $M_4$). The drain-to-source voltage of the FET ($M_1$, $M_2$, $M_3$ or $M_4$) is representative of the AC source signal $V_{AC}$ as well as the level of drain-to-source current through the FET ($M_1$, $M_2$, $M_3$ or $M_4$). More particularly, the signal $V_{SENSE}$ represents the instantaneous level of $V_{AC}$ and, thus, represents the point in the repetitive cycle of the AC source at each instant. The signal $V_{SENSE}$ also represents the level of current through the FET ($M_1$, $M_2$, $M_3$ or $M_4$) since the FET has a drain-to-source resistance ($R_{DS}$). The signal $V_{SENSE}$ is applied to a first input terminal (e.g., inverting input) of the comparator 254 and to a first input terminal (e.g., non-inverting input) of the comparator 256. A second input terminal of the comparator 254 receives the first reference voltage Vref1 while a second input terminal of the comparator 256 receives the second reference voltage Vref2. The first reference voltage Vref1 can be, for example, −100 mV, while the second reference voltage Vref2 can be, for example, −1 mv. Therefore, the first reference voltage Vref1 is lower than the second reference voltage Vref2. In an embodiment, the level of Vref2 is adjustable for fine-tuning operation of the control circuit 250, e.g., by laser trimming.

Synchronous rectification is performed as follows. When the level of $V_{AC}$ is above zero, the controller 250 in the position of $U_1$ (FIG. 3) turns on the FET $M_1$ so that it is conducting (ON). The controller 250 in the position of $U_3$ also turns on the FET $M_3$ so that it is conducting (ON), while the controllers 250 in the position of $U_2$ and $U_4$ turn off the FET $M_2$ and $M_4$ so that they are non-conducting (OFF). This causes the voltage $V_{AC}$ to be passed to the output $V_{DC}$ without reversing its polarity.

Conversely, when the level of $V_{AC}$ is below zero, the controller 250 in the position of $U_1$ (FIG. 3) turns off the FET $M_1$ so that it is non-conducting (OFF). The controller 200 in the position of $U_3$ also turns off the FET $M_3$ so that it is non-conducting (OFF), while the controllers 250 in the position of $U_2$ and $U_4$ turn on the FET $M_2$ and $M_4$ so that they are conducting (ON). This causes the voltage $V_{AC}$ to be passed to the output $V_{DC}$ with its polarity reversed. This cycle is repeated for each cycle of the input signal $V_{AC}$ thereby forming the rectified DC the signal $V_{DC}$.

The above is accomplished in accordance with the following synchronous switching cycle. When the drain-to-source voltage $V_{DS}$ applied to the controller 250 is positive, the MOSFET ($M_1$, $M_2$, $M_3$ or $M_4$) is off (non-conducting). Under these conditions, the level of $V_{DS}$ is essentially equal to the instantaneous input voltage $V_{AC}$. Also, the FET $M_6$ charges Vcc with current until Vcc reaches its maximum regulated level (e.g., 20 volts DC) at which point the FET M6 stops charging Vcc. Thus, the FET $M_6$ regulates Vcc. Also, under these conditions, the level of $V_{SENSE}$ is positive, which causes the comparators 254 and 256 and logic 258 to hold the switch $S_2$ on and the switch $S_1$ off. When the switch $S_2$ is on, the current source 12 discharges the gate of the MOSFET ($M_1$, $M_2$, $M_3$ or $M_4$), which reduces the gate voltage and maintains the MOSFET off.

Then, as the drain-to-source voltage $V_{DS}$ applied to the control circuit 250 falls, due to the instantaneous level of the input $V_{AC}$ falling, the level of $V_{SENSE}$, which follows $V_{DS}$, falls as well. When $V_{DS}$ falls below the level of Vcc, the MOSFET $M_6$ effectively shorts the drain terminal of the controller 250 and $V_{SENSE}$ together (though the on-resistance $R_{DS}$ of the MOSFET $M_6$ may be approximately 400 ohms) and the diode $D_8$ prevents Vcc from discharging through the drain terminal of the control circuit 250. As a result, a high-voltage sensing resistor is not required (as in the case of $R_{SENSE}$ in FIG. 4). Therefore, a frequency pole at the $V_{SENSE}$ node is of high frequency so that frequency compensation is not required for this node.

Then, once of the drain-to-source voltage $V_{DS}$ applied to the control circuit 250 falls below zero volts, the level of VSENSE reaches a threshold set by Vref2 (e.g., −1 mV), which causes the comparator 256 to activate the logic 258 to open the switch $S_2$ so that the switch $S_2$ is off. At this point, $S_1$ and $S_2$ are both open (off) so that the level of the gate terminal of the controller 250 floats and remains at approximately zero volts with respect to the source terminal of the controller 250.

Then, as the drain-to-source voltage $V_{DS}$ applied to the control circuit 250 continues to fall, and before the body diode of the MOSFET ($M_1$, $M_2$, $M_3$ or $M_4$) turns on, the level of $V_{SENSE}$ reaches an "on" threshold set by Vref1 (e.g., −100 mV), which causes the comparator 254 to activate the logic 258 to close the switch $S_1$. The capacitor $C_{10}$ causes a delay between the time that $V_{SENSE}$ reaches the "on" threshold and the closing of the switch $S_1$. This delay (e.g., 200 microseconds) prevents shoot-through of adjacent MOSFETs ($M_1$, $M_2$, $M_3$ or $M_4$). When the switch $S_1$ closes, this commences to drive a current (e.g., 100 microamps) from the current source $I_1$ to the gate of the MOSFET ($M_1$, $M_2$, $M_3$ or $M_4$) via the gate terminal of the control circuit 250.

As the drain-to-source voltage $V_{DS}$ applied to the control circuit 250 falls below approximately −0.5 to −1.0 volts, the body diode of the MOSFET ($M_1$, $M_2$, $M_3$ or $M_4$) clamps this voltage. And, as the from the current source $I_1$ turns on the MOSFET ($M_1$, $M_2$, $M_3$ or $M_4$), this raises $V_{DS}$ to approximately −0.1 volts. This $R_{DS}$-on of the MOSFET ($M_1$, $M_2$, $M_3$ or $M_4$) is less than the on-voltage drop of a diode and thereby prevents power loss that would occur in the case of a bridge rectifier that employs diodes for rectification.

When the drain-to-source voltage $V_{DS}$ applied to the control circuit 250 is between Vref1 and Vref2, the switch $S_1$ opens (turns off) while the switch $S_2$ remains open). Thus, level of the gate terminal of the control circuit 250 floats and the MOSFET ($M_1$, $M_2$, $M_3$ or $M_4$) stays on. As a result of this floating gate, frequency compensation is not required. Together, the current sources $I_1$ and $I_2$ and the switches $S_1$ and $S_2$ function as a charge pump to charge and discharge the gate of the corresponding MOSFET $M_2$, $M_3$ or $M_4$) and to allow the gate to float at appropriate times.

Then, as the drain-to-source voltage $V_{DS}$ applied to the control circuit 250 begins to rise again, due to the instantaneous level of the input $V_{AC}$ rising, the level of $V_{SENSE}$, which follows $V_{DS}$, rises. Once the level of $V_{SENSE}$ rises above $Vref_2$ (e.g., −1 mV), the comparator 256 activates the logic 258 to close (turn on) the switch $S_2$, which draws current from the gate terminal of the control circuit 250 and turns off the MOSFET ($M_1$, $M_2$, $M_3$ or $M_4$). The switch $S_1$ remains open (off).

The above-described synchronous switching cycle repeats for each cycle of the input voltage $V_{AC}$.

Because the comparators 254 and 256 are activated at different levels of $V_{SENSE}$ to turn the MOSFETs $M_1$, $M_2$, $M_3$ and $M_4$ on and off, and due to delay caused by the capacitor $C_{10}$, this results in hysteresis and prevents any adjacent FETs ($M_1$, $M_2$, $M_3$ or $M_4$) from being on at the same time which could cause shoot through or short circuiting. This is despite the controllers $U_1$, $U_2$, $U_3$ and $U_4$ all operating independently.

The comparators 254 and 256 can be implemented by op-amps, trans-conductance amplifiers, trans-impedance amplifiers, and so forth. In operation, when the corresponding MOSFET $M_1$, $M_2$, $M_3$ and $M_4$ is on, the control circuit 250 functions to regulate the $V_{DS}$ at the level of $Vref_1$ (100 mV).

As described above, when $V_{DS}$ is greater than Vcc, the FET $M_6$ shown in FIG. 7 functions to charge Vcc, but only up to its maximum regulated level of approximately 20 volts DC; the FET $M_6$ blocks higher voltages of $V_{AC}$ from reaching the $V_{SENSE}$ node (by presenting a high impedance). Also, when $V_{DS}$ is less than Vcc, the FET $M_6$ effectively shorts the drain and $V_{SENSE}$ node together (by presenting a low impedance) which avoids the need for a high-voltage sensing resistor and the corresponding need to provide frequency compensation for a frequency pole which would result from such a sensing resistor.

Figure 8A:
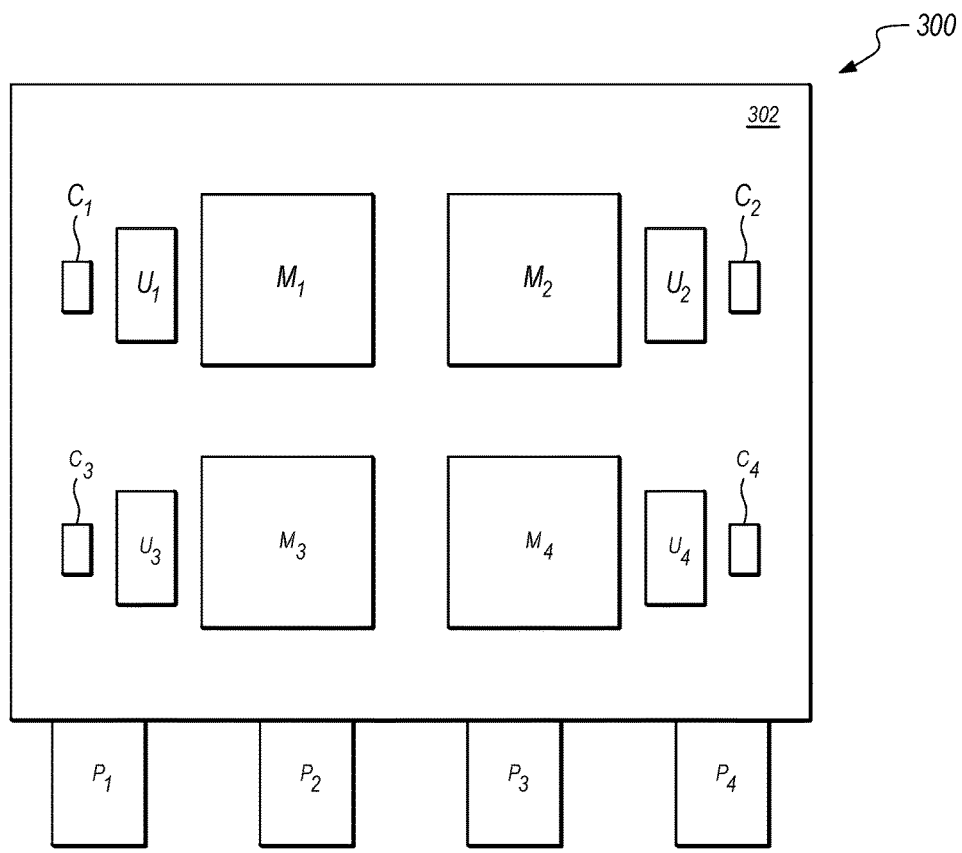
FIGS. 8A-B illustrates an integrated circuit package for a synchronous bridge rectifier in accordance with an embodiment of the present invention.
Figure 8B:
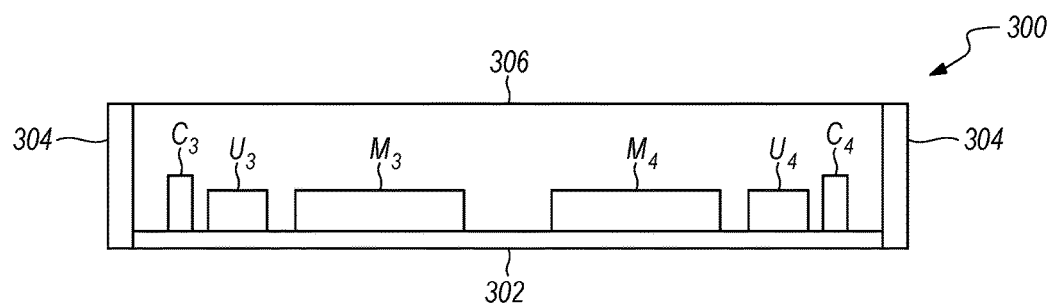

FIGS. 8A-B illustrates an integrated circuit package 300 for a synchronous bridge rectifier in accordance with an embodiment of the present invention. FIG. 7A illustrates a top view of the IC package 300 while FIG. 7B illustrates a side view As shown in FIGS. 8A-B, a printed circuit board 302 has mounted thereon the FETs $M_1$, $M_2$, $M_3$ and $M_4$, capacitors $C_1$, $C_2$, $C_3$ and $C_4$ and controllers $U_1$, $U_2$, $U_3$ and $U_4$. These components can be mounted to one side of the printed circuit board 302. Each of the FETs $M_1$, $M_2$, $M_3$ and $M_4$, capacitors $C_1$, $C_2$, $C_3$ and $C_4$ and controllers $U_1$, $U_2$, $U_3$ and $U_4$ can be implemented as a single die for a total of twelve dies for the integrated circuit package 300 for a full-bridge synchronous bridge rectifier. As is also shown in FIG. 8A, exactly four pins $P_1$, $P_2$, $P_3$, and $P_4$, are provided, with two of the pins (e.g., pins $P_2$ and $P_3$) providing input terminals for the AC source $V_{AC}$ and two of the pins (e.g., pins $P_1$ and $P_4$) providing output terminals for the rectified DC output $V_{DC}$. As also shown in FIG. 7B, the package 300 may be provided with end caps 304. Filler 306, such as epoxy or resin may be used to fill cavities among the components and between the end caps 304.

In an alternative embodiment, an integrated circuit package can include two controller circuits, each with corresponding FET and capacitor. For example, each of the FETs $M_1$ and $M_3$, capacitors $C_1$ and $C_3$ and controllers $U_1$ and $U_3$ can be implemented as a single die for a total of six dies for the integrated circuit package. Such a package can have exactly three terminals. Two such packages can be combined to form a bridge rectifier having two AC input terminals and two DC output terminals. For example, each of the FETs $M_2$ and $M_4$, capacitors $C_2$ and $C_4$ and controllers $U_2$ and $U_4$ can be implemented as a single die for a total of six dies for the second integrated circuit package.

Figure 9:
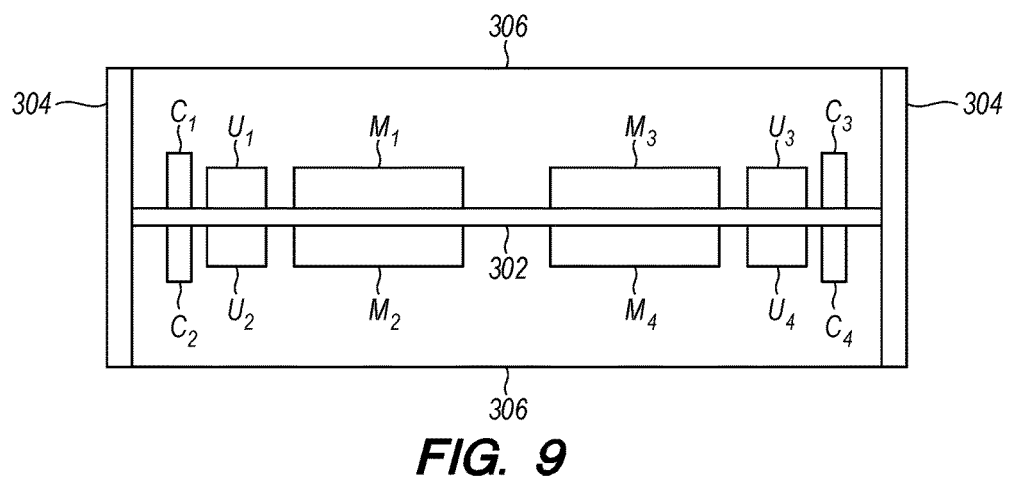
FIG. 9 illustrates an alternative integrated circuit package for a synchronous bridge rectifier in accordance with an embodiment of the present invention.

FIG. 9 illustrates an alternative integrated circuit package for a synchronous bridge rectifier in accordance with an embodiment of the present invention. As shown in FIG. 9, the components, including FETs $M_1$, $M_2$, $M_3$ and $M_4$, capacitors $C_1$, $C_2$, $C_3$ and $C_4$ and controllers $U_1$, $U_2$, $U_3$ and $U_4$ may be mounted to opposite sides of a single PCB 302 or mounted to two PCBs that are then sandwiched together with the component sides facing away from each other. As before, end caps 304 and filler 306 may be provided.

Figure 10:
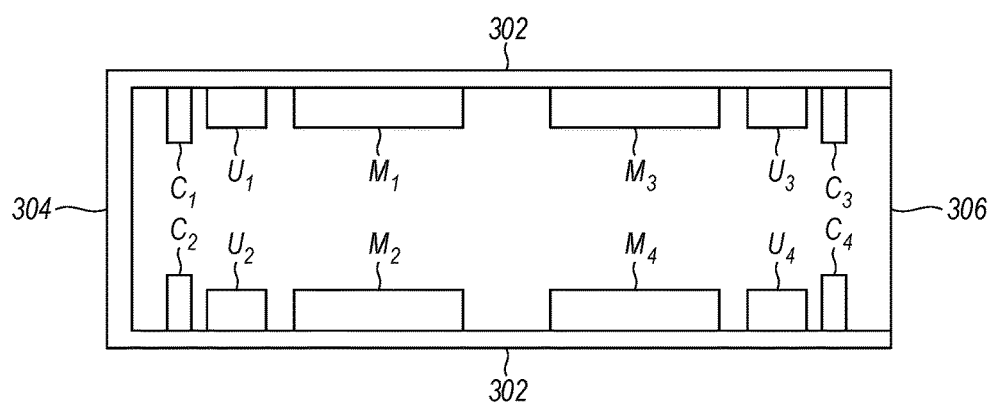
FIG. 10 illustrates an alternative integrated circuit package for a synchronous bridge rectifier in accordance with an alternative embodiment of the present invention.

FIG. 10 illustrates an alternative integrated circuit package for a synchronous bridge rectifier in accordance with an alternative embodiment of the present invention. As shown in FIG. 10, the components, including FETs $M_1$, $M_2$, $M_3$ and $M_4$, capacitors $C_1$, $C_2$, $C_3$ and $C_4$ and controllers $U_1$, $U_2$, $U_3$ and $U_4$ may be mounted to two PCBs that are then mounted such that the component sides are facing each other. One or more end caps 304 and filler 306 may be provided.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A synchronous bridge rectifier comprising
a plurality of synchronously switched elements; and
a plurality of controller circuits, one for each of the synchronously switched elements, wherein each controller circuit is configured to sense voltage across the corresponding synchronously switched element to control opening and closing of the synchronously switched element to rectify the alternating current input signal to form a direct current output signal, and wherein power for operating each controller circuit is derived from the voltage across the corresponding switched element.

2. The synchronous bridge rectifier according to claim 1, wherein each of the synchronously switched elements comprises a field-effect transistor.

3. The synchronous bridge rectifier according to claim 2, wherein each field-effect transistor is controlled by a corresponding controller circuit that is configured to sense voltage across the drain and source of the field-effect transistor and, in response to the sensed voltage, controls the gate of the field-effect transistor to turn the field-effect transistor on and off at appropriate times to rectify the alternating current input signal to form a direct current output signal.

4. The synchronous bridge rectifier according to claim 3, wherein each controller circuit is included within a corresponding integrated circuit, each integrated circuit having a corresponding power supply configured to obtain power from the alternating current input signal for powering the integrated circuit, the power being derived from the voltage across the drain and source of the field-effect transistor.

5. The synchronous bridge rectifier according to claim 4, further comprising a plurality of capacitors, wherein each capacitor is coupled to a corresponding controller circuit, and wherein the capacitor serves as an energy reservoir to provide power to the controller circuit at times when the power supply of the controller circuit is unable to obtain power from the alternating current input signal.

6. The synchronous bridge rectifier according to claim 5, wherein each controller circuit has exactly four terminals, including a gate terminal configured to control the gate of the corresponding field-effect transistor, a drain terminal corresponding to the drain of the corresponding field-effect transistor, a source terminal corresponding to the source of the corresponding field-effect transistor and a supply terminal.

7. The synchronous bridge rectifier according to claim 5, wherein each combination of a field-effect transistor and corresponding controller circuit and capacitor comprises exactly two terminals corresponding to the drain and source of the field-effect transistor.

8. The synchronous bridge rectifier according to claim 5, further comprising a printed circuit board package comprising four controller circuits, each with corresponding field effect transistor and capacitor.

9. The synchronous bridge rectifier according to claim 8, wherein the printed circuit board package has exactly four terminals, including two input terminals configured to accept the alternating current input signal and output terminals configured to provide a rectified direct current signal.

10. The synchronous bridge rectifier according to claim 3, wherein each controller circuit operates independently of the other controller circuits without centralized control, operation of the controller circuits being synchronized by each controller sensing the alternating current input signal.

11. The synchronous bridge rectifier according to claim 3, wherein each controller circuit lacks a high-side driver for driving the gate of the corresponding field-effect transistor.

12. The synchronous bridge rectifier according to claim 3, wherein the field-effect transistors are maintained off when voltage across the drain and source of the field-effect transistors indicates a light load demand on the direct current output signal.

13. A synchronous switching unit comprising:
a first field-effect transistor having a gate, a drain and a source;
a first control circuit having a gate terminal coupled to the gate of the first field-effect transistor, a drain terminal coupled to the drain of the first field-effect transistor, a source terminal coupled to the source of the first field-effect transistor and a supply terminal; and
a capacitor having a first terminal coupled to the supply terminal, and the capacitor having a second terminal coupled to the source terminal.

14. The switching unit according to claim 13, wherein the switching unit has exactly two terminals, a drain terminal corresponding to the drain of the first field-effect transistor and a source terminal corresponding to the source of the first field-effect transistor.

15. The switching unit according to claim 13, wherein the first control circuit comprises:
a first comparator configured to compare a sensing signal that is representative of a drain-to-source voltage of the first field-effect transistor to a first reference voltage level for turning the first field-effect transistor off; and
a second comparator configured to compare the sensing signal that is representative of the drain-to-source voltage of the first field-effect transistor to a second reference voltage level for turning the first field-effect transistor on.

16. The switching unit according to claim 15, wherein the first control circuit further comprises a power supply configured to obtain power from an alternating current source to supply power to components of the first control circuit, the power being derived from the drain-to-source voltage of the first field-effect transistor.

17. The switching unit according to claim 16, wherein the capacitor supplies power to components of the first control circuit when the alternating current source is unavailable to supply power to components of the first control circuit.

18. A control circuit for synchronous switching, the control circuit comprising:
a first terminal;
a second terminal, wherein the control circuit senses a voltage across the first terminal and the second terminal;
a third terminal for controlling a switch for performing synchronous rectification based on the voltage across the first terminal and the second terminal;
a fourth terminal for generating a supply voltage across an energy storage element; and
a depletion mode MOSFET configured to generate a current for charging the energy storage element, wherein the depletion mode MOSFET is configured to regulate the supply voltage when the voltage across the first terminal and the second terminal is greater than the supply voltage, and wherein the depletion mode MOSFET is configured to generate a sensing signal that is representative of the voltage across the first terminal and the second terminal when the voltage across the first terminal and second terminals is less than the supply voltage.

19. The control circuit according to claim 18, wherein the depletion mode MOSFET is configured to prevent the sensing signal from reaching a maximum level of the voltage across the first terminal and the second terminal.

20. The control circuit according to claim 19, wherein the depletion mode MOSFET connects the first terminal of the control circuit to the sensing signal by an on-resistance of the depletion mode MOSFET when the voltage across the first terminal and the second terminal is below the level of the supply voltage.

21. The control circuit according to claim 19, wherein the control circuit does not require a high-voltage sensing resistor for sensing the voltage across the first terminal and the second terminal and wherein the control circuit does not require frequency compensation for such a sensing resistor.

22. The control circuit according to claim 18, further comprising a diode coupled to the fourth terminal for preventing discharge of the energy storage element when the voltage across the first terminal and second terminals is less than the supply voltage.

23. The control circuit according to claim 22, wherein the depletion mode MOSFET charges the energy storage element through the diode.

24. The control circuit according to claim 18, wherein the depletion mode MOSFET is configured to prevent the sensing signal from exceeding a level of the voltage supply by more than an on-voltage of the diode.

25. The control circuit according to claim 18, wherein the control circuit is configured to turn on the switch when the voltage across the first terminal and the second terminal is positive and to turn off the switch when the voltage across the first terminal and the second terminal is negative.

26. The control circuit according to claim 25, wherein the control circuit employs hysteresis in controlling the switch.

27. The control circuit according to claim 25, wherein the control circuit is configured to control a gate terminal of a MOSFET switch via the third terminal of the control circuit.

28. The control circuit according to claim 25, wherein the control circuit is configured to control the gate terminal of the MOSFET switch using a charge pump to control a voltage level of the gate terminal of the MOSFET.

29. The control circuit according to claim 28, wherein the control circuit turns off the switch by discharging the gate terminal using the charge pump.

30. The control circuit according to claim 29, wherein the control circuit turns on the switch by charging the gate terminal using the charge pump.

31. The control circuit according to claim 30, wherein the control circuit ceases discharging the gate terminal when the sensed voltage falls below a first threshold.

32. The control circuit according to claim 31, wherein the control circuit commences charging the gate terminal when the sensed voltage falls below a second threshold.

33. The control circuit according to claim 32, wherein the control circuit ceases charging the gate terminal when the sensed voltage rises to a level between the first and second thresholds.

34. The control circuit according to claim 33, wherein the gate terminal floats when the sensed voltage rises to a level between the first and second thresholds and thereby frequency compensation is not required.

35. The control circuit according to claim 33, wherein the control circuit commences discharging the gate terminal when the sensed voltage rises to a level above the first threshold.

36. A synchronous bridge rectifier comprising:
a first field-effect transistor having a gate, a drain and a source, the source of the first field-effect transistor forming a first AC input node;
a second field-effect transistor having a gate, a drain and a source, the drain of the first field-effect transistor being coupled to the drain of the second field-effect transistor thereby forming a first DC output node;
a third field-effect transistor having a gate, a drain and a source, the source of the second field-effect transistor being coupled to the drain of the third field-effect transistor thereby forming a second AC input node;
a fourth field-effect transistor having a gate, a drain and a source, the source of the third field-effect transistor being coupled to the source of the source of the fourth field-effect transistor and the drain of the fourth field-effect transistor being coupled to the source of the first field-effect transistor thereby forming a second DC output node;
a first control circuit coupled to the gate of the first field-effect transistor and configured to a sense a voltage across the source and drain of the first field-effect transistor for turning the first field-effect transistor off and on, wherein power for operating the first control circuit is derived from the voltage across the source and drain of the first field-effect transistor;
a second control circuit coupled to the gate of the first field-effect transistor and configured to a sense a voltage across the source and drain of the second field-effect transistor for turning the first field-effect transistor off and on wherein power for operating the second control circuit is derived from the voltage across the source and drain of the second field-effect transistor;
a third control circuit coupled to the gate of the first field-effect transistor and configured to a sense a voltage across the source and drain of the first field-effect transistor for turning the first field-effect transistor off and on, wherein power for operating the third control circuit is derived from the voltage across the source and drain of the third field-effect transistor; and
a fourth control circuit coupled to the gate of the first field-effect transistor and configured to a sense a voltage across the source and drain of the first field-effect transistor for turning the first field-effect transistor off and on, wherein the synchronous bridge rectifier is configured to convert an AC voltage source applied across the first and second AC input nodes into a rectified DC output voltage across the first and second DC output nodes, wherein power for operating the fourth control circuit is derived from the voltage across the source and drain of the fourth field-effect transistor.

37. The synchronous bridge rectifier according to claim 36, wherein the first control circuit has exactly four terminals, a gate terminal coupled to the gate of the first field-effect transistor, a drain terminal coupled to the drain of the first field-effect transistor, a source terminal coupled to the source of the first field-effect transistor and a supply terminal coupled to a first terminal of a capacitor, the second terminal of the capacitor being coupled to the source terminal.

38. The synchronous bridge rectifier according to claim 37, wherein the first control circuit comprises an integrated circuit controller having the four terminals.

39. The synchronous bridge rectifier according to claim 37, further comprising a switching converter coupled to receive the rectified DC output.

40. The synchronous bridge rectifier according to claim 37, wherein the first, second, third and fourth control circuits are identical to each other.

* * * * *